United States Patent [19]
Chandross et al.

[11] 3,928,683
[45] Dec. 23, 1975

[54] CORROSION INHIBITOR

[75] Inventors: Edwin Arthur Chandross, Berkeley Heights; Valerie Jeanne Kuck, Upper Montclair, both of N.J.

[73] Assignee: Bell Telephone Laboratories, Incorporated, Murray Hill, N.J.

[22] Filed: May 6, 1974

[21] Appl. No.: 467,108

[52] U.S. Cl. ............... 428/447; 428/450; 428/457; 427/387; 427/388
[51] Int. Cl.² ...................... B32B 9/04; B32B 9/06
[58] Field of Search ............ 117/201, 212, 5.5, 213; 106/14; 428/447, 450, 457; 427/387, 388

[56] References Cited
UNITED STATES PATENTS

| | | | |
|---|---|---|---|
| 3,458,351 | 7/1969 | Held et al. | 117/201 |
| 3,471,541 | 10/1969 | Morehouse | 106/14 |
| 3,701,795 | 10/1972 | Holub et al. | 106/14 |

*Primary Examiner*—Michael F. Esposito
*Attorney, Agent, or Firm*—E. M. Fink

[57] ABSTRACT

Electrical devices including metal surfaces to which electrical connections are to be made by soldering are described, such surfaces having a siloxane prepolymer coating deposited thereon. The siloxane coatings protect the metal surfaces against surface alteration which would tend to render soldering thereto more difficult.

9 Claims, 1 Drawing Figure

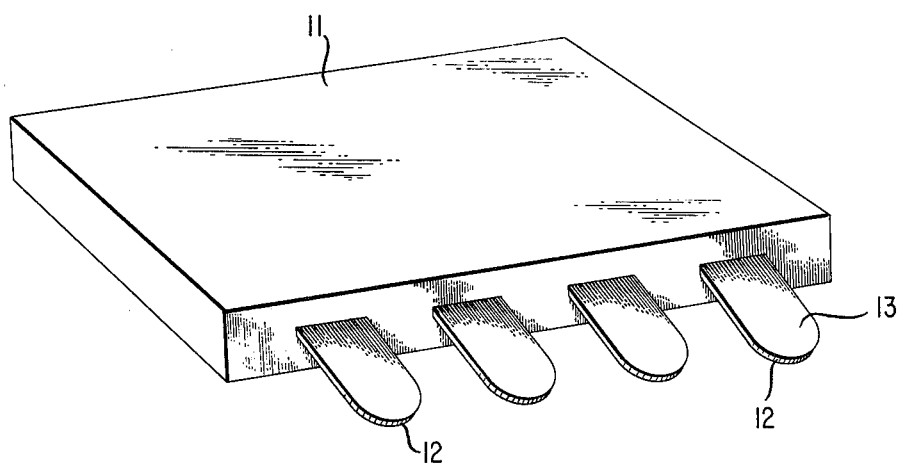

CORROSION INHIBITOR

This invention relates to electrical devices including metal surfaces to which electrical connections are to be made by soldering and to a technique for promoting the solderability of such surfaces. More particularly, the present invention relates to electrical devices including copper or copper alloy surfaces and to a technique for promoting the solderability thereof by deposition thereon of a thin film of a siloxane prepolymer.

Metal surfaces destined for soldering have always been a matter of concern to workers in the electronics industry. It has long been recognized that such surfaces, typically copper and alloys thereof, are somewhat unstable under the influence of heat and moisture exposure, so resulting in surface alterations which increase the difficulties encountered in making acceptable solder connections thereto.

In order to promote solderability of these surfaces, a variety of chemical compositions have been employed as heat and moisture protectants. Unfortunately, the compositions selected for such purpose have not proven satisfactory for the lengthy periods of exposure required in conventional applications.

In accordance with the present invention, the prior art limitations are effectively obviated by the use of a composition which is capable of promoting solderability of the described surfaces to an extent not heretofore attainable. Briefly, the invention is implemented by depositing a siloxane prepolymer upon the surface of interest by hydrolysis and partial condensation of an acylated aminoalkyltrialkoxysilane. Studies have revealed that coatings so deposited protect metal surfaces against surface alteration which would tend to render soldering thereto more difficult but through which coating soldering can be effected.

The invention will be more readily understood by reference to the accompanying drawing wherein:

The FIGURE is a perspective view of a typical electrical component having copper surfaces destined for subsequent soldering.

With reference now more particularly to the FIGURE, there is shown an encapsulated component 11 including a plurality of copper containing fingers 12 destined for soldering. Shown deposited upon the surface of fingers 12 is a thin coating 13 of the prepolymer described herein.

The siloxane prepolymer employed in the practice of the present invention comprises side chain substituents made up of terminal alkyl groups, containing at least 3 carbon atoms, joined by means of amide linkages to alkylene groups, containing not more than 6 carbon atoms, which are in turn bonded to silicon atoms of the siloxane. As noted previously, the prepolymer is a hydrolyzed, partially condensed acylated aminoalkyltrialkoxysilane, the alkoxysilane being of the general formula:

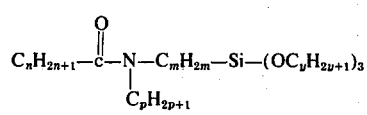

wherein $n$ is an integer from 3–17, $p$ is an integer from 0–3, $m$ is an integer from 2–6 and $y$ is an integer from 1–3.

The alkoxysilanes may conveniently be obtained from commercial sources or prepared in accordance with well known techniques. A typical synthesis involves reacting an alkanoyl halide with an aminoalkyltrialkoxysilane in the presence of an acid acceptor as shown in equation 1:

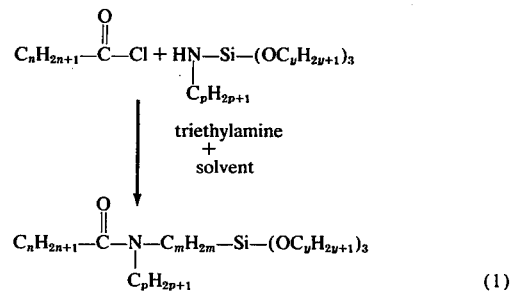

(1)

wherein $n$ is an integer from 3–17, $p$ is an integer from 0–3, $m$ is an integer from 2–6 and $y$ is an integer from 1–3.

Studies have revealed that suitable coatings may be deposited with a solution of the monomer described above. However, the prepolymer obtained by hydrolysis and partial condensation of the monomer has been found to result in a superior product. Accordingly, the monomer is preferably converted to a prepolymer by effecting partial condensation by reacting it with a strong acid and water in a ratio of silane to water ranging from 1:1 to 1:2.5 and heating for a time period ranging from ½ to 2 hours as shown in equation 2 below, the longer time periods corresponding with the smaller mole fraction to water:

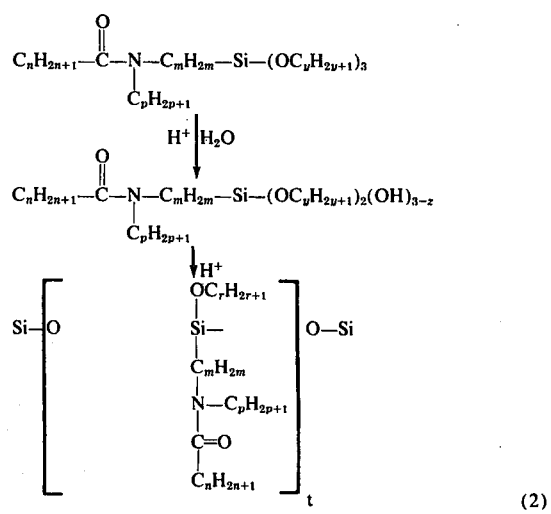

(2)

wherein $n$ is an integer from 3–17, $p$ is an integer from 0–3, $m$ is an integer from 2–6, $z$ and $r$ are integers from 0–3 and $t$ is an integer ranging up to 20.

It will be understood by those skilled in the art that the prepolymers described above may be subjected to further condensation to yield more highly condensed derivatives which may be of interest for the purposes intended herein.

The prepolymer so obtained is soluble in organic alcohols, methyl, ethyl and propyl alcohols being convenient for such use. Storage of the prepolymer is effected in solution in a non-flammable, non-air polluting solvent comprising a perhalogenated hydrocarbon. The FREON derivatives are most suitable for this purpose. More specifically, the prepolymer is stored as a 0.4 to 5.0% by volume, solution in a perhalogenated hydrocarbon alcohol mixture. A suitable mixture for this purpose comprises 97% 1,1,2-trichloro-1,2,2-trifluoroethane-3% ethanol.

As indicated, the invention contemplates coating metal surfaces selected from among copper, and alloys thereof, the materials most commonly employed in the fabrication of electronic components. Prior to coating the surface of interest, a conventional cleansing technique is employed for the purpose of removing surface contaminants. Following, the surface is dip coated in the prepolymer solution, air dried and heated to a state of reduced solubility, so indicating that crosslinking of the polymer has occurred. The thickness of the coating so deposited is not critical, a practical limit being within the range of 0.1–5 microns. After curing, the siloxane is found to be strongly chemisorbed to the metal surface, it being theorized that a Si-oxygen metal bond is formed. Following, various tests may be run to determine whether the coating effectively retards oxidative degradation or degrades under the conditions normally encountered in soldering applications so that satisfactory connections can be made.

The following exemplary embodiments serve to illustrate the invention but are not intended to limit it thereto.

EXAMPLE I 30 gms (0.184 mole) of octanoyl chloride were added in small increments to a solution of 40 gms, (0.208 mole) of gamma aminopropyltriethoxysilane and 48 milliliters (0.344 mole) of triethylamine in 570 milliliters of hexane. After a period of 12 hours, the precipitated hydrochloride salts were removed by suction filtration and the filtrate washed with 0.1 normal citric acid, 0.1 molar sodium bicarbonate and finally with distilled water. The solution was then dried over sodium sulfate and the solvent removed under reduced pressure leaving crude octanolyaminopropyltriethoxysilane.

The partial condensation of the siloxane was next effected by adding 0.01 normal hydrochloric acid thereto in the ratio of 1 mole of silane to 2 moles of water and heating the resultant solution for 1 hour at 75°C. Upon cooling, the solution was diluted with ethyl ether, washed to neutrality with 0.1 molar sodium bicarbonate, washed twice with distilling water and dried over sodium sulfate. The solvent was then removed in a rotary evaporator leaving the desired partially condensed siloxane as a moderately viscous liquid. The prepolymer was then stored as a 0.6% solution in a 97% 1,1,2-trichloro-1,2,2-trifluoroethane-3% ethanol mixture.

A copper panel was then selected for testing purposes and initially cleansed by immersion in aqueous nitric acid, (1:1), rinsed in water and blown dry with a stream of nitrogen. Following, the panel was dip coated with the siloxane prepolymer, dried in air and heated at 100°C for 5 minutes in an oven. The sheen of the copper was slightly dulled after curing of the prepolymer. The thickness of the coating was approximately 1 micrometer. The solderability of the resultant panel was then measured according to EIA (Electronics Industry Association) RS 178A with an immersion time of 10 seconds in a solder bath. The panel evidenced satisfactory solderability.

EXAMPLE II

The procedure of Example I was repeated. The panel was placed in a 95°F — 90% relative humidity chamber and after one month it was tested in the aforementioned manner for solderability characteristics. The panel evidenced satisfactory solderability.

EXAMPLE III

A copper film having a thickness less than 500 A was evaporated upon a glass microscope slide and dipped in a 0.6% prepolymer solution (of Example I) and cured. The corrosion level of the copper was then evaluated by visual inspection. The appearance of corrosion was not detected after exposure of the slide to 50% relative humidity at ambient temperatures for a period of 4 days.

EXAMPLE IV

A printed circuit board comprising an epoxy glass substrate including 16 copper line paths was dipped in the prepolymer solution of Example I and cured for 5 minutes at 100°C. Prior to coating, the breakdown voltage for the line paths ranged from 1400 to 2000 volts. After coating, the line paths evidenced a breakdown voltage ranging from 1200 to 1800 volts with one failure attributed to the presence of dirt, so indicating negligible changes in electronic characteristics.

What is claimed is:

1. An electrical device having a metal surface to at least a portion of which electrical connections are to be made by soldering, and having a coating on said portion which protects it against surface alteration which would tend to render such soldering more difficult but through which coating soldering can be effected, said coating comprising a polysiloxane having side chain substituents made up of terminal alkyl groups, containing at least 3 carbon atoms, joined by means of amide linkages to alkylene groups, containing not more than 6 carbon atoms, which are in turn bonded to silicon atoms of the siloxane.

2. Electrical device in accordance with claim 1 wherein the polysiloxane is comprised of repeating units of the general formula:

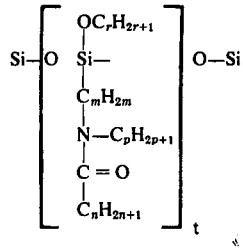

wherein $n$ is an integer from 3–17, $p$ and $r$ are integers from 0–3, $m$ is an integer from 2–6 and $t$ is an integer ranging up to 20.

3. Electrical device in accordance with claim 2 wherein $m$ is 3, $r$ is 2 and $n$ is 7.

4. Electrical device in accordance with claim 1 wherein the polysiloxane coating has a thickness ranging from 0.1–5 microns.

5. Electrical device in accordance with claim 1 wherein the metal surface comprises copper.

6. Electrical device in accordance with claim 3 wherein the metal surface comprises copper.

7. Technique for promoting the solderability of a metal surface to at least a portion of which electrical connections are to be made by soldering which comprises the steps of
   a. coating the surface with a thin film of a polysiloxane having side chain substituents made up of terminal alkyl groups, containing at least 3 carbon atoms, joined by means of amide linkages to alkylene groups, containing not more than 6 carbon atoms, which are in turn bonded to silicon atoms of the siloxane, and
   b. curing the coating to a state of reduced solubility.

8. Technique in accordance with claim 7 wherein said polysiloxane is obtained by hydrolysis and partial condensation of an acylated aminoalkyltrialkoxysilane in a solvent by reacting it with a strong acid and water in a ratio of siloxane to water ranging from 1:1 to 1:2.5.

9. Technique in accordance with claim 7 wherein hydrolysis and partial condensation are effected by reacting the aminoalkyltrialkoxysilane with a strong acid and water in a ratio of silane to water ranging from 1:1 to 1:2.5.

* * * * *